(12) United States Patent
Ederer et al.

(10) Patent No.: US 11,541,596 B2
(45) Date of Patent: *Jan. 3, 2023

(54) METHOD AND DEVICE FOR PRODUCING THREE-DIMENSIONAL MODELS USING A BINDING AGENT SYSTEM

(71) Applicant: Voxeljet AG, Friedberg (DE)

(72) Inventors: Ingo Ederer, Geltendorf (DE); Daniel Günther, Munich (DE); Ulrich Recknagel, Zwickau (DE); Florian Mögele, Gessertshausen (DE)

(73) Assignee: VOXELJET AG, Friedberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/018,247

(22) Filed: Sep. 11, 2020

(65) Prior Publication Data

US 2020/0406602 A1 Dec. 31, 2020

Related U.S. Application Data

(63) Continuation of application No. 15/029,759, filed as application No. PCT/DE2014/000546 on Oct. 29, 2014, now Pat. No. 10,786,945.

(30) Foreign Application Priority Data

Oct. 30, 2013 (DE) ..................... 10 2013 018 182.8

(51) Int. Cl.
*B33Y 70/00* (2020.01)
*B29C 64/165* (2017.01)
(Continued)

(52) U.S. Cl.
CPC .......... *B29C 64/165* (2017.08); *B29C 64/245* (2017.08); *B29C 64/295* (2017.08);
(Continued)

(58) Field of Classification Search
CPC ... B29C 64/165; B29C 64/245; B29C 64/295; B29C 64/40; B29C 64/153;
(Continued)

(56) References Cited

U.S. PATENT DOCUMENTS 3,913,503 A 10/1975 Becker
4,247,508 A 1/1981 Housholder
(Continued)

FOREIGN PATENT DOCUMENTS

AU 720255 B2 5/2000
CN 101146666 A 3/2008
(Continued)

OTHER PUBLICATIONS

Cima et al., "Computer-derived Microstructures by 3D Printing: Bio- and Structural Materials," SFF Symposium, Austin, TX, 1994.
(Continued)

*Primary Examiner* — Susan D Leong
*Assistant Examiner* — Xinwen Ye
(74) *Attorney, Agent, or Firm* — The Dobrusin Law Firm, P.C.

(57) ABSTRACT

The invention relates to a method, a device and a binding agent system for producing three-dimensional models.

20 Claims, 7 Drawing Sheets

(51) Int. Cl.
  *B29C 64/245* (2017.01)
  *B29C 64/295* (2017.01)
  *B33Y 10/00* (2015.01)
  *B33Y 30/00* (2015.01)
(52) U.S. Cl.
  CPC ............... *B33Y 10/00* (2014.12); *B33Y 30/00* (2014.12); *B33Y 70/00* (2014.12)
(58) Field of Classification Search
  CPC . B29C 2035/0822; B33Y 70/00; B33Y 30/00; B33Y 10/00; B33Y 40/20; B23K 2103/36; B23K 2103/42
  See application file for complete search history.

(56) References Cited

U.S. PATENT DOCUMENTS

| | | |
|---|---|---|
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A * | 4/1993 | Sachs .................. B28B 1/001 419/2 |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,824,250 A | 10/1998 | Whalen |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A * | 12/2000 | Langer .................. B22C 1/00 164/456 |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,363,606 B1 | 4/2002 | Johnson |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 * | 7/2002 | Bredt .................. C04B 28/001 428/297.4 |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |

(56) References Cited

U.S. PATENT DOCUMENTS

| | | |
|---|---|---|
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,905,645 B2 | 6/2005 | Iskra |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1* | 1/2005 | Hochsmann ........... B33Y 70/00 425/375 |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Ederer et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1 | 12/2005 | Russell et al. |
| 2005/0283136 A1 | 12/2005 | Skarda |
| 2006/0012058 A1 | 1/2006 | Hasei |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0176346 A1 | 8/2006 | Ederer et al. |
| 2006/0208388 A1 | 9/2006 | Bredet et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |

(56) References Cited

U.S. PATENT DOCUMENTS

| | | |
|---|---|---|
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0207288 A1 | 8/2010 | Dini |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0108726 A1* | 5/2013 | Uckelmann ............ B29C 64/393 425/174.4 |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0318251 A1 | 3/2016 | Ederer et al. |
| 2016/0107386 A1 | 4/2016 | Hartmann et al. |
| 2016/0114533 A1 | 4/2016 | Grassegger et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Ederer et al. |
| 2017/0210037 A1 | 7/2017 | Ederer et al. |
| 2017/0217098 A1 | 8/2017 | Hartmann et al. |
| 2017/0297263 A1 | 10/2017 | Ederer et al. |
| 2017/0305139 A1 | 10/2017 | Hartmann |
| 2017/0326693 A1 | 11/2017 | Ederer et al. |
| 2017/0355137 A1 | 12/2017 | Ederer et al. |
| 2018/0079133 A1 | 3/2018 | Ederer et al. |
| 2018/0141271 A1 | 5/2018 | Gunter et al. |
| 2018/0141272 A1 | 5/2018 | Hartmann et al. |
| 2018/0169758 A1 | 6/2018 | Ederer et al. |
| 2018/0222082 A1 | 8/2018 | Gunther et al. |
| 2018/0222174 A1 | 8/2018 | Guneter et al. |
| 2018/0319078 A1 | 11/2018 | Ederer et al. |
| 2018/0326654 A1 | 11/2018 | Ederer et al. |
| 2018/0326662 A1 | 11/2018 | Gunther et al. |
| 2018/0333781 A1 | 11/2018 | Ederer et al. |
| 2018/0369910 A1 | 12/2018 | Gunter et al. |
| 2019/0047218 A1 | 2/2019 | Ederer et al. |
| 2019/0084229 A1 | 3/2019 | Gunther |
| 2020/0055246 A1 | 2/2020 | Gunther et al. |
| 2020/0130263 A1 | 4/2020 | Gunther et al. |

FOREIGN PATENT DOCUMENTS

| | | |
|---|---|---|
| CN | 109055212 A * | 12/2018 |
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102006038858 A1 | 2/2008 |
| DE | 102007040755 A1 | 3/2009 |
| DE | 102007047326 A1 | 4/2009 |
| DE | 102011053205 A1 | 3/2013 |
| DE | 102015006363 A1 | 12/2016 |
| DE | 102015008860 A1 | 1/2017 |
| DE | 102015011503 A1 | 3/2017 |
| DE | 102015011790 A1 | 3/2017 |
| EP | 0361847 B1 | 4/1990 |
| EP | 0431924 B1 | 6/1991 |
| EP | 1415792 | 5/2004 |
| EP | 1457590 A | 9/2004 |
| EP | 1524049 A2 | 4/2005 |
| EP | 1381504 B1 | 8/2007 |
| GB | 2297516 A | 8/1996 |
| JP | S62275734 A | 11/1987 |
| JP | 2003136605 A | 5/2003 |
| JP | 2004082206 A | 3/2004 |
| JP | 2009202451 A | 9/2009 |
| WO | 90/03893 A1 | 4/1990 |
| WO | 01/034371 A2 | 5/2001 |
| WO | 01/40866 A2 | 6/2001 |
| WO | 01/78969 A2 | 10/2001 |
| WO | 02/026419 A1 | 4/2002 |
| WO | 2004/014637 A1 | 2/2004 |
| WO | 2006/100166 A1 | 9/2006 |
| WO | 2007/114895 A2 | 10/2007 |
| WO | 2008/049384 A1 | 5/2008 |
| WO | 2008061520 A2 | 5/2008 |
| WO | 2011063786 A1 | 6/2011 |
| WO | 2013075696 A1 | 5/2013 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |

(56) References Cited

FOREIGN PATENT DOCUMENTS

| WO | 2015085983 A2 | 6/2015 |
|---|---|---|
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |
| WO | 2016146095 A1 | 9/2016 |

OTHER PUBLICATIONS

Marcus, et al., Solid Freeform Fabrication Proceedings, Sep. 1995, p. 130-33.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Jacobs et al., 2005 SME Technical Paper, title "Are QuickCast Patterns Suitable for Limited Production?".
Translation of International Search Report, Application No. PCT/DE2014/000546, dated Mar. 20, 2015.
Written Opinion of the International Search Authority, Application No. PCT/DE2014/000546, dated Mar. 20, 2015.

* cited by examiner

METHOD AND DEVICE FOR PRODUCING THREE-DIMENSIONAL MODELS USING A BINDING AGENT SYSTEM

CLAIM OF PRIORITY

This patent application is a continuation of U.S. patent application Ser. No. 15/029,759 filed on Apr. 15, 2016, which claims priority to International Patent Application PCT/DE2014/000546, filed on Oct. 29, 2014, and to German Patent Application DE 10 2013 018 182.8 filed on Oct. 30, 2013. This patent application claims priority to U.S. patent application Ser. No. 15/029,759 (published as US 2016/0263828 A10), International Patent Application PCT/DE2014/000546 (published as WO 2015/062569 A1) and German Patent Application DE 10 2013 018 182.8, each incorporated herein by reference in its entirety.

FIELD OF THE INVENTION

The invention relates to a method and a device as well as a binder system for producing three-dimensional models.

A method for producing three-dimensional objects from computer data is described in the European patent specification EP 0 431 924 B1. In this method, a particulate material is applied in a thin layer to a platform, and a binder material is selectively printed on the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is reached. A three-dimensional object is thereby produced from the printed and solidified areas.

After it is completed, this object produced from solidified particulate material is embedded in loose particulate material and is subsequently removed therefrom. This is done, for example, using an extractor. This leaves the desired objects, from which powder deposits are removed, for example by manual brushing.

Of all the layering techniques, 3D printing based on powdered materials and the supply of liquid binder is the fastest method. This method may be used to process different particulate materials, including natural biological raw materials, polymers, metals, ceramics and sands (not an exhaustive list).

For example, a solid in the particulate material may be used as the binding system. This solid is dissolved by means of a solvent which is expelled from the ink-jet print head. After the solvent evaporates, the particles stick together in the desired locations.

The component may be removed from the remaining loose powder after a certain waiting period. The waiting period is generally long, since the solvent is only slowly released from the dissolved material. The components are often weak after unpacking and can be plastically deformed. The volatilization of the solvent produces a certain deposit buildup on the component, which must be removed manually after unpacking. The solvent may additionally attack the print head. Moreover, the dissolution process and subsequent resolidification causes shrinkage in the component and thus also geometric deviations.

A solvent may also be loaded with molecules or particles and then used. This may reduce shrinkage. The aggressiveness of the solvent may also be decreased while maintaining the same component strength. However, the solvent must be completely removed before unpacking, and the problem of deposit buildup occurs here as well.

Another option is to use a system that chemically results in a solidification of the printed fluid and thereby causes a binding of the particles. The system components are kept separate in the system, if possible. The desired solidification reaction does not occur until the printing process. One example of a system of this type may be a method known as the cold resin process. An acid-encased sand is brought into contact with furfuryl alcohol. This results in a chemical reaction which causes the previously liquid components to be converted to a cross-linked plastic.

These systems significantly reduce the aforementioned shrinkage. The monomers used nevertheless present a danger to the print head. The monomers for processes of this type often have an aggressiveness that is comparable to that of solvents. The more or less latent cross-linked plastics pose a permanent risk to the print head, since they may solidify at any time, due to contaminants or undesirable catalysis reactions, and thus damage the print head.

Due to their high reactivity, both systems are hazardous material systems which may be harmful to the environment and may be used only in industrial environments.

Another way to further minimize the aforementioned problems is to use an initiator system which is not present in the powder. Radiation-hardening systems are frequently described in the literature. They have certain disadvantages, depending on the chemical and physical hardening system. In the case of UV-hardening systems, for example, the complete, layer-by-layer hardening is a disadvantage, since it results in a delay in the build process. Another disadvantage is that no layer bonding occurs with excessively hard irradiation. Pure IR-hardening systems also suffer from this problem.

One object of the invention was therefore to provide a binder system, a method and a device which avoids or at least reduces the disadvantages of the prior art.

BRIEF DESCRIPTION OF THE INVENTION

In one aspect, the invention comprises a method for producing three-dimensional (3D) molded bodies (components) by means of 3D printing.

In another aspect, the invention comprises a device for carrying out the 3D printing method according to the invention.

In one aspect, the invention comprises a binder system which includes at least two components.

DETAILED DESCRIPTION OF THE INVENTION

A number of terms in the invention are explained in greater detail below.

Within the meaning of the invention, "3D printing methods" are all methods known from the prior art which facilitate the construction of components in three-dimensional molds and are compatible with the described method components and devices. In particular, these are powder-based methods, for example SLS (selective laser sintering).

A "binder" or "binder system" within the meaning of the invention is composed of two components and generally relates to a novolak or resol system having a solvent. All known 3D printing-compatible phenols and alcoholic and aqueous solvents may be used which are known to those skilled in the art and therefore do not need to be described in greater detail here. Special components and phenols are indicated in the following description. Acids or bases are required for producing the novolak or resol systems of the invention, it being possible to use all acids and bases known for novolaks and resols which are known to those skilled in the art.

The "prepolymerisates" contained in the binders of the invention may vary depending on the application and are adapted to the other material components, such as particulate materials.

All materials known for powder-based 3D printing, in particular sands, ceramic powders, metal powders, plastics, wood particles, fibrous materials, celluloses and/or lactose powders, may be used as "particulate materials." The particulate material is preferably a dry, free-flowing and a cohesive, firm powder.

"Temperature regulation" of the particulate material is understood to mean that the powder material applied to the build space is held in its totality within a certain temperature window.

Within the meaning of the invention, a "heating" or "heat treatment" after the application of binder is the selective heating of the material areas provided with binder for building up the component. The temperature is significantly increased compared to the ambient temperature and the temperature-regulated particulate material on the build space.

According to the invention, the selective heating is carried out no earlier than after each second application of particulate material or after a constant or varying number of application steps. Within the meaning of the invention, the particulate material is distributed evenly over the build space and is smoothed off before another application of particulate material takes place.

Within the meaning of the invention, "selective binder application" or "selective binder system application" may take place after each particulate material application or irregularly, depending on the requirements of the molded body and for the purpose of optimizing the production of the molded body, i.e., non-linearly and not in parallel after each particulate material application. "Selective binder application" or "selective binder system application" may thus be set individually and during the course of producing the molded body.

"Finishing treatment steps" or "additional treatment steps" within the meaning of the invention are all methods known to those skilled in the art, to which the molded body obtained by the 3D printing process may be subjected, for example another heat treatment.

"Molded body" or "component" within the meaning of the invention are all three-dimensional objects that are produced with the aid of the method according to the invention and/or the device according to the invention and which have a nondeformability.

Any known 3D printing device that contains the necessary components may be used as the "device" for carrying out the method according to the invention. Common components include a coater, a build space, a means for moving the build space or other components, a dosing device and a heating means and other components which are known to those skilled in the art and therefore do not need to be listed in greater detail here.

"Counting means" for the particle layer application within the meaning of the invention may be a mechanical or other type of means, which is suitable for measuring the number of particle layer applications. It may be coupled with a control unit for other components or functions and/or software.

The invention, along with its preferred specific embodiments, is described in greater detail below.

In particular, the invention relates to a method for producing a component (3D molded body), wherein (a) a particle layer is applied to a building platform (102) in a first step with the aid of a powder coater (101); (b) a binder (400) is selectively applied in a second step with the aid of a binder dosing device (100); (c) the applied layer or layers is/are subjected to a heat treatment in another step with the aid of a heat source (600); (d) the building platform (102) is lowered by the thickness of one layer, or the powder coater (101) and possibly additional device components is/are raised by the thickness of one layer; steps a) through d) are repeated until the component is built up, the heat treatment (c) being carried out after every second or additional layer application step.

The heat treatment is preferably carried out at a temperature of 100° C. to 170° C., preferably 130° C. to 160° C.

The invention also relates to a binder system which is suitable for a 3D printing method, comprising or including at least one adhesive and a solvent and possibly other additives.

The binder system according to the invention preferably contains a thermally secondarily cross-linkable prepolymerisate as the adhesive and one or multiple alcohols and/or water as the solvent. The binder system according to the invention particularly preferably comprises or includes a novolak and/or resol system and a solvent and possibly other additives.

A binder system which includes a novolak and/or resol system, as used in the shell molding method, has proven to be particularly suitable (e.g., Corrodur® from Hüttenes-Albertus Chemische Werke GmbH).

All suitable solvents may be used in the binder system according to the invention, the solvent being an alcohol, preferably ethanol and/or 2-propanol, and/or an aqueous solvent, preferably water and 2-propanol.

The binder system according to the invention preferably contains other additives, which are selected from the group of tensides and antifoaming agents.

In one preferred specific embodiment, the binder system according to the invention is characterized in that the solvent is alcohol-based and preferably contains no more than 30% resin.

On one particularly preferred specific embodiment, the binder system according to the invention furthermore includes up to 5% polyol, preferably glycol, propylene glycol or xylitol.

The binder system according to the invention preferably has one or multiple of the following advantageous characteristics at room temperature: In the preferred specific embodiment, the viscosity is between 5 and 40 mPas, particularly preferably between 8 and 20 mPas; a surface tension of 20 to 40 mN/m is preferred, 25 to 35 mN/m being particularly preferred. In one preferred specific embodiment, the vapor pressure of the binder system is no higher than 55 hPa, particularly preferably no higher than 40 hPa.

The method according to the invention advantageously represents a chemical system comprising a solvent and a binding component, in which it was surprisingly possible to achieve the fact that high unpacking and final strengths were obtained by selecting the special components. A high edge sharpness without deposits is also advantageously achieved, due to the lack of a reaction part in the particulate material.

According to the invention, an aggressive solvent is furthermore avoided, and the print head is thus advantageously not subjected to the danger of damage. This guarantees continuous machine runtimes and avoids the need to repair or replace machine parts. On the whole, the avoidance of aggressive solvents, which are required in other methods according to the prior art, has many practical advantages, such as a reduced threat to material and personnel, as well as positive economical consequences, due to continuous machine runtimes and the avoidance of damage to the printing machines.

It has proven to be particularly advantageous if the heat treatment step in the method according to the invention is not carried out after each layer application and binder application but instead is carried out only after every second, preferably after every second to seventh, layer application. The heat treatment step is particularly advantageously carried out after every second, preferably after every fourth to sixth, layer application, most preferably after every fifth layer application.

The hardening operation is thus preferably carried out in layers but not with each consecutive layer. Among other things, this results in a faster workflow and thus an accelerated production speed.

This surprisingly achieves the fact that a better binding of the layers is achieved in the component and thus a frequently occurring "flaking" of the layers is avoided.

It has surprisingly proven to be particularly advantageous if the particulate material is temperature-regulated on the building platform. The component may be thereby produced in an even better quality, depending on the particulate materials (sands) used. It has proven to be advantageous if the particulate material is held at a temperature that is no less than 50° C. to 70° C., preferably no less than 55° C. to 65° C., most preferably no less than 60° C.

The component produced by means of the method according to the invention may be subjected to additional known work steps, such as an additional heat treatment step, preferably at a temperature of 150° C. to 200° C. This heat treatment step preferably takes place after unpacking.

In the method according to the invention, the binder described above or the binder system described above is preferably used. The binder or the binder system is preferably selectively applied with the aid of a binder dosing device and selectively solidifies the particulate material.

In principle, the method has the advantage that nearly all materials known in 3D printing methods may be used. The particulate material is preferably selected from the group comprising sands, ceramic powders, metal powders, plastics, wood particles, fibrous materials, celluloses and/or lactose powders. The particulate material is particularly preferably a dry, free-flowing powder, a cohesive, firm powder or a liquid-based dispersion.

The practical and economical advantages of the method according to the invention are excellent. The method is not bound to specific particulate materials (sands) and may be used practically universally, in contrast to known methods from the prior art. One example is the furan resin method, in which no alkaline sands may be used.

Compared to known methods, the particulate material (the sand) also does not have to be pretreated or premixed. The residual sand, which does not form the component, may be reused and recycled in the method without a great deal of effort. An admixture process, which is otherwise necessary, or complex cleaning steps are dispensed with. The material only has to be sieved. Material costs are thereby saved, while handling effort is reduced and labor costs cut. This has a positive effect on the component costs.

It is also possible to process the components without an additional heat treatment step.

Depending on the geometry, the binder content may furthermore be varied globally as well as selectively by means of the print resolution as well as selectively within the geometry. This is also not possible with known prior-art methods, since possible mixing ratios of the reactants may no longer be in the optimum range during printing, which results in quality problems. One example of this is the furanic system, since the acid causes problems in the sand unless the correct amount of reactant is present.

In another aspect, the invention is a device for 3D printing, which includes (a) a powder coater (101), a building platform (102), at least one binder dosing device (100), at least one heat source (600), preferably an IR emitter (604), preferably a lifting device (605) for lowering and raising the building platform (102) or the powder coater (101) and possibly other components, such as the binder dosing device (100) and the heat source (600), preferably an extraction device (606) and a counting means (607) for counting the particle powder layers applied. The device preferably also has a contact heater (602) or a hot air device (608).

In particular, the binder dosing device (dosing device) may comprise, for example, an ink-jet print head, which selectively doses the binder onto the build space in individually dispensable droplets. The binder dosing device may also comprise a filament dispensing system, the binder being selectively dosed onto the build space in the form of a thin, switchable filament.

The device according to the invention and the method according to the invention may be used in all 3D printing methods, preferably in powder-based 3D printing processes.

Additional details, preferred specific embodiments and advantages of the invention are discussed below.

According to the invention, a system is essentially used for building models in layers with the aid of ink-jet printing. The sequence according to the prior art is as follows: a layer of powder is applied to a building platform and leveled. A fluid is then printed onto the layer according to the layer data of the 3D model. The printed areas change one or multiple properties (strength, water solubility, etc.). The material usually solidifies due to a binding component in the liquid binder (e.g., an adhesive). The building platform is subsequently lowered, and the process begins all over again.

A very low viscosity is generally needed for the ability to print a liquid with the aid of an ink-jet print head. To do this, the liquid binding components (binder) usually have to be diluted. Solvents are generally used for this purpose. If each layer is heated, e.g., with the aid of radiation, the surface temperature of the layer to be printed is also very high. As a result, the solvent very quickly evaporates. The binder cannot penetrate deeply enough into the layer and thereby bind the layers together. The structural body will flake apart. In many cases, the strategy of heating less does not work, since the solidification sets in only above the evaporation temperature of the solvent. A positive process window cannot be found in known methods.

Figure 1:
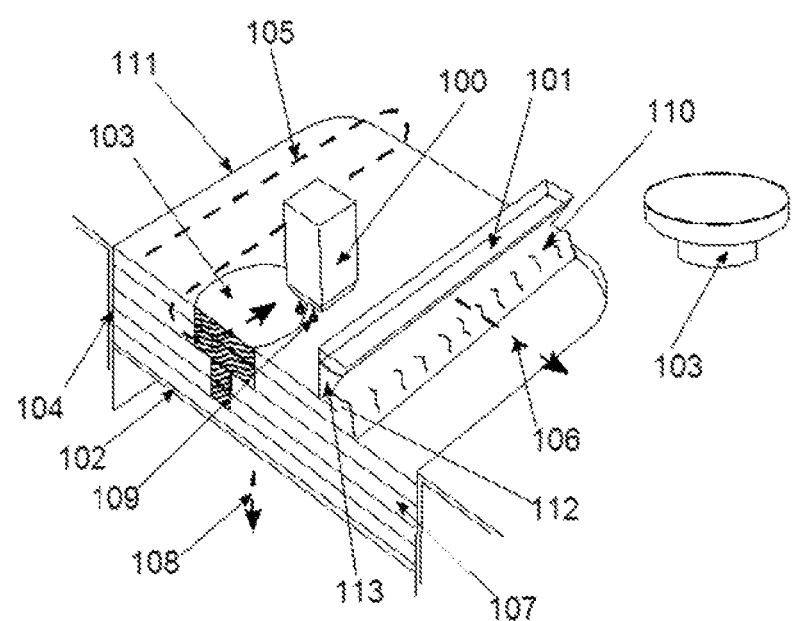
FIG. 1 shows a schematic representation of the components of a powder-based 3D printer in a sectional isometric view.

The device may include a powder coater (101) and a dosing device (100) that move over a build space, such as illustrated in FIG. 1. The powder coater may deposit a powder material (112) in layers (107, 111). The powder coater may move in a linear direction (106). The powder coater (101) may apply a quantity of the powder material (110) downstream of the coater and then smooth the powder material to form a top layer (111), such as illustrated in FIG. 1. The powder coater (101) may have an elongated container (113) for holding the powder material. The dosing device (102) may selectively apply a fluid (109) for forming a part (103). The dosing device may move in a path (105) over a build space (112). The device may include a build platform (102) that moves in a direction (108), preferably by a distance of the layer thickness.

By means of the method according to the invention and the device according to the invention, a stable, firm-edged and well defined structural body may be advantageously produced, for example if hardening takes place only after every fifth layer application. The solidification is thus completed only after adequate diffusion of the binding component (binder/binder system). The evaporation of the solvent of the fifth layer surprisingly does not impair the structural body.

In test series, it was possible to document that the number of exposures can increase, while no relationship between the layering time, liquid supply and IR radiation power resulting in satisfactory structural bodies was found when exposing every layer.

The system according to the invention draws heavily on powder-based 3D printing. The mechanical engineering of the device according to the invention has been expanded according to the requirements of the method according to the invention.

The device according to the invention includes a power coater. Particulate material is applied thereby to a building platform and smoothed (FIG. 2(a)). The applied particulate material may comprise a wide range of materials. For example, sands, ceramic powders, metal powders, plastic, wood particles, fibrous materials, celluloses, lactose powders, etc. may be used. The flow characteristics of these materials may vary enormously. Different coater techniques permit layering from dry, free-flowing powders and cohesive, firm powders to liquid-based dispersions. The height of powder layers is determined by the building platform. It is lowered after one layer has been applied. During the next coating operation, the resulting volume is filled and the excess smoothed. The result is a nearly perfectly parallel and smooth layer of a defined height.

After a coating process, a liquid is printed on the layer with the aid of an ink jet print head (FIG. 2(b)). The print image corresponds to the section of the component at the present build height of the device. The fluid strikes and slowly diffuses into the particulate material.

Figure 2:
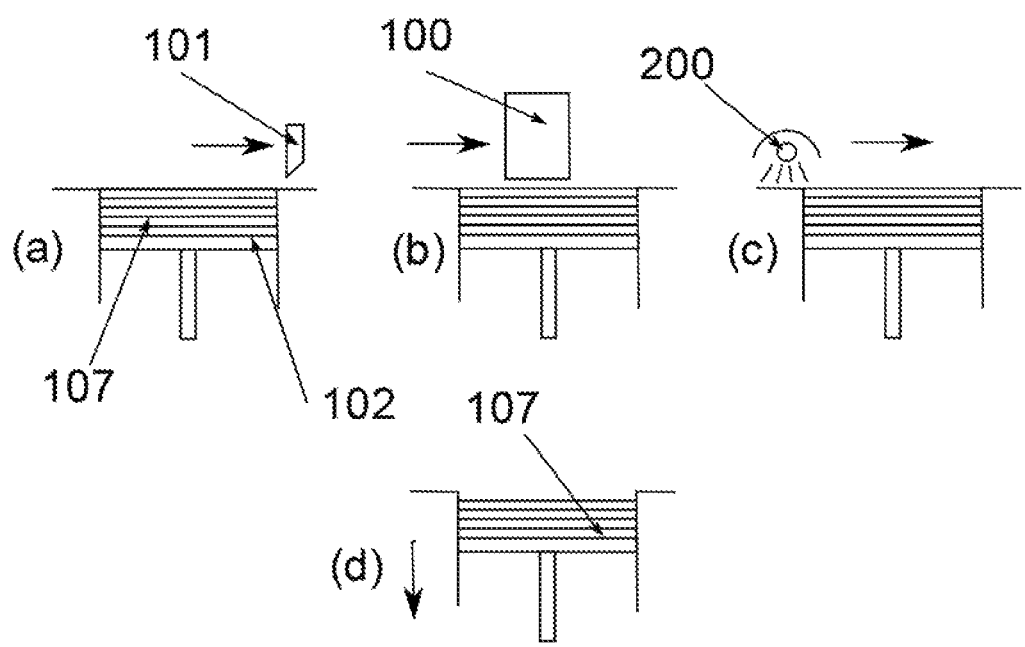
FIG. 2 shows a sequence of a conventional 3D printing process with the use of a layered radiation hardening technique.

After the binder, preferably the binder system according to the invention, is printed, the layer is solidified using the method according to the invention (FIG. 2 (c)). For this purpose, an IR emitter may be passed over the build space. This emitter may be coupled with the axis of the coating system. The solvent evaporates during heating. In the case of liquids that present a fire hazard, the evaporating material is extracted immediately.

Figure 3:
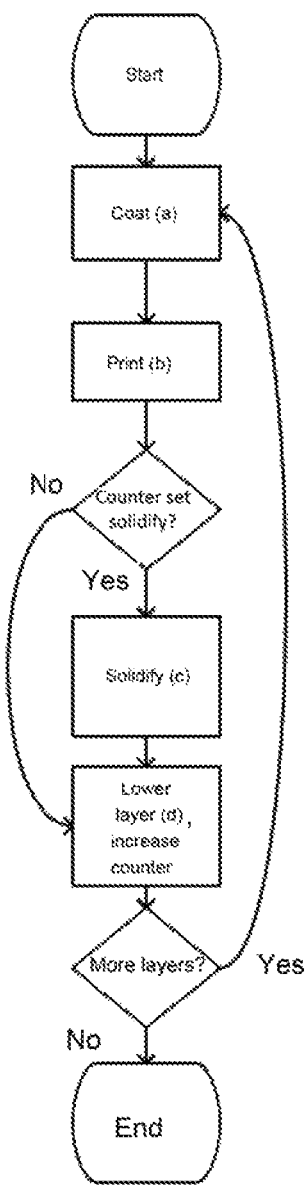
FIG. 3 shows a sequence of a building process, using a radiation hardening technique, which does not take place with each layer.

The controller of a machine according to the invention may count the layers and change the sequence only after, for example, every second layer and trigger a solidification run (FIG. 3). However, the energy supply may be estimated based on measured data, and the frequency of the solidification runs may be adapted. Examples include solidification runs after three, four, five or six layers of the particulate material and preferably the binder. The printed liquid quantities, which fluctuate depending on the layer image, are essentially an interference variable of a control of this type. Instead of control based on sensor data, the information may also be linked within the controller.

Figure 4:
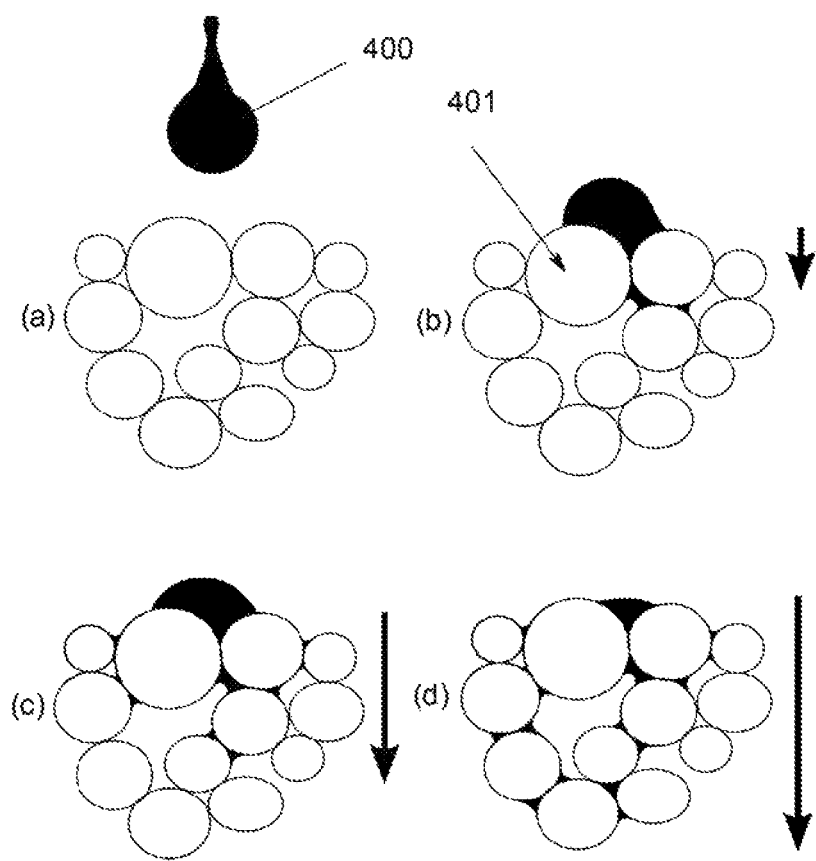
FIG. 4 shows a diagram of the binder diffusion process.
Figure 5:
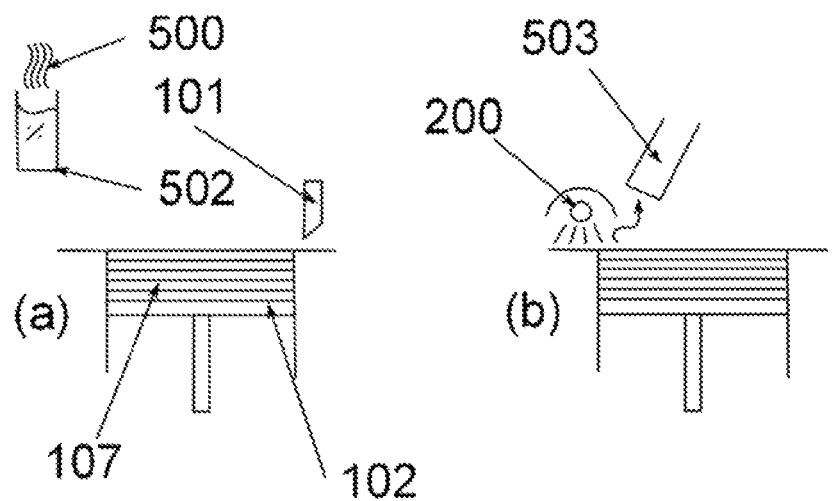
FIG. 5 shows combined energy supplies via an IR emitter and convective heating of the powder.
Figure 6:
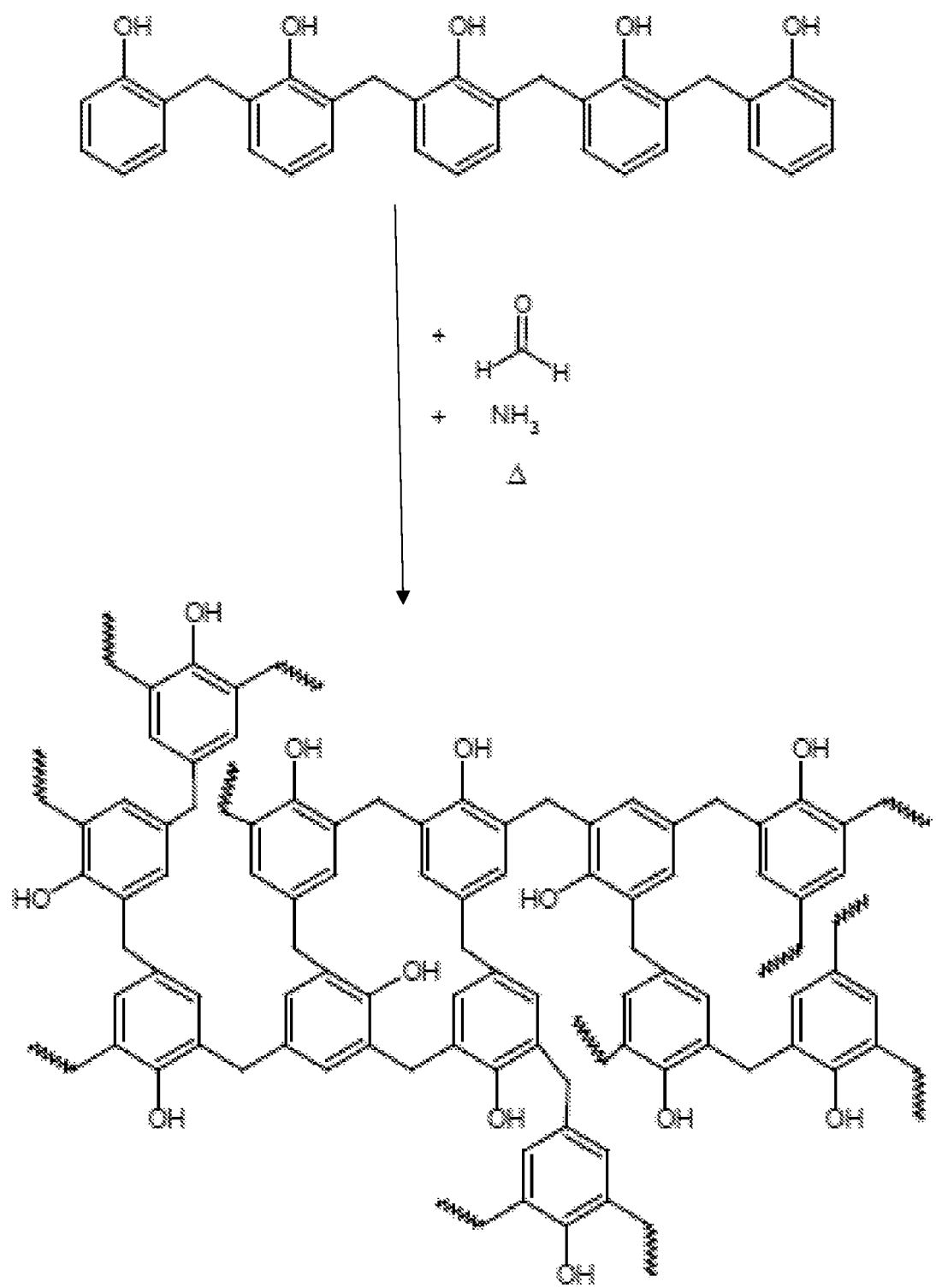
FIG. 6 shows a chemical reaction equation for solidifying a novolak system, using a formaldehyde source with the introduction of heat.

FIG. 4 shows an example of a droplet which penetrates the powder (particulate material). After steps (a) through (d), the penetration is deep enough to bind the layers. The diffusion quickly slows down, since the droplet has disappeared as a reservoir. If printing takes place on an excessively preheated layer, the solvent abruptly boils, and the binder becomes highly viscous. As a result, it remains in the state shown in FIG. 4(b). It therefore does not form a layer bond.

In addition to IR irradiation, the powder may also be preheated. Contact heaters, hot air or IR emitters are suitable for this purpose. This preheating makes it possible to effectively control the IR solidification process at low lamp powers and to achieve high process speeds.

After the solidification step, the building platform is lowered by the thickness of one layer (FIG. 2(d)). The complete component is created by repeating the aforementioned steps.

Figure 7:
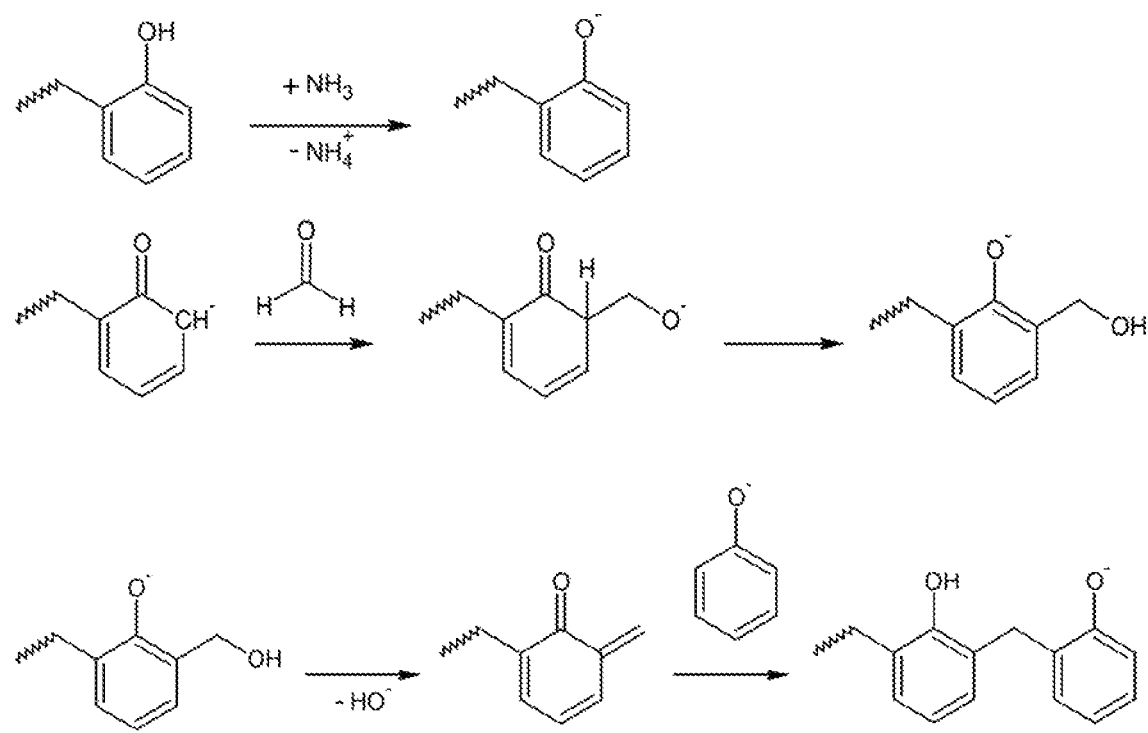
FIG. 7 shows details of the reaction.

An exemplary representation of a chemical system which may be used according to the invention, based on a formaldehyde-hardenable novolak system, is as follows: novolaks are known from their use as a shell of sand having the designation Croning resin. Finished solutions of such resins and hardening additives, which are used for coating sand, may be purchased, for example, from Hüttenes-Albertus Chemische Werke GmbH. In preliminary tests, alcohol-based solutions have proven to be easily processed with the aid of ink-jet printing systems, due to their viscosity as well as their compatibility with the novolak system, the resin content preferably being less than 30%. Other additives, such as tensides and antifoaming agents, may be added to optimize printability, and up to 5% polyols, such as glycol, propylene glycol or xylitol, may be added to finely adjust the viscosity. The thermal hardening of the novolak after the selective introduction of the liquid into the particulate material takes place by the breakdown, e.g., of urotropine as the hardening additive in ammonia and formaldehyde and ultimately by a reaction with formaldehyde with the novolak according to the reaction equation in FIG. 7. The starting temperature of the hardening additive must be well removed from room temperature so that no undesirable reactions begin. The print solution set in this manner is then selectively introduced in layers into the particulate material with the aid of a print head, the particulate material having a temperature of preferably at least 60° C. during the entire build process. The evaporation speed of the excess solvent is increased, due to the temperature of the sand, and is continuously removed in the continuous extraction flow. The actual hardening process takes place by further supply of heat to the printed particulate material, preferably with the aid of an IR lamp, the temperature temporarily rising above 160° C. The exposure operation is preferably repeated every five layers, the build process always terminating with an exposure operation. During an exposure operation, a significant change in color of the printed areas, from ocher hues to brown, indicates the polymerization. Due to the formaldehyde and ammonia released at high temperature as a catalyst, the existing prepolymerisate is cross-linked in another condensation reaction to form a duroplast. After the final exposure step, the components are preferably left in the unprinted particulate material for another hour. To further increase the strength, the unpacked components may be preferably stored in the oven for another hour at a temperature between 150° C. and 200° C. The system is particularly characterized in that the components may be effortlessly removed from the unprinted sand and have a very high edge sharpness.

LIST OF REFERENCE NUMERALS

100 Binder dosing device (dosing device)
101 Powder coater
102 Building platform
103 Component (3D molded part)
104 Build space boundary
107 Powder layers
200 Solidifying unit
400 Binder
401 Powder particles
500 Heat effect
502 Storage device
503 Extraction system

What is claimed is:

1. A method for producing a component comprising the steps of: (a) applying a particle layer including a particulate material to a building platform in a first step with the aid of a powder coater; (b) applying a binder system in a second step with the aid of a dosing device; (c) subjecting the applied layer or layers to a heat treatment in another step with the aid of a heat source; and (d) lowering the building platform by the thickness of one layer, or raising the powder coater and possibly additional device components by thickness of one layer; wherein steps a) through d) are repeated until the component is built up wherein the binder system includes i) a novolak and/or a resol; and ii) a solvent; wherein the dosing device includes a print head, and the applied particulate material has a temperature of at least 60° C. during an entire build process until the component is built up.

2. A method according to claim 1, wherein the heat treatment is carried out at a temperature of 100° C. to 170° C.

3. A method according to claim 1, wherein the particulate material is selected from the group consisting of sands, ceramic powders, metal powers, plastics, wood particles, fibrous materials, celluloses and lactose powders.

4. The method of claim 1, wherein the binder system has a viscosity of 5 to 40 mPas.

5. The method of claim 4, wherein the binder system has a vapor pressure at room temperature of 55 hPa or less.

6. The method of claim 5, wherein the binder system has a surface tension of 20 to 40 mN/m.

7. The method of claim 1, wherein the particulate material is preheated.

8. The method of claim 1, wherein the binder is applied as droplets, and penetrates the particulate material deep enough to bind the layers.

9. The method of claim 1, wherein the particulate material includes a sand.

10. The method of claim 9, wherein the penetration of the binder into the particulate material is stopped by evaporation of the solvent.

11. The method of claim 10, wherein the heat treatment polymerizes and/or cross-links the binder.

12. The method of claim 9, wherein a resin content of the binder system is less than 30 percent.

13. The method of claim 9, wherein the binder system has a vapor pressure at room temperature of 55 hPa or less.

14. The method of claim 13, wherein the binder system has a viscosity of 5 to 40 mPas and/or the solvent has a surface tension of 20 to 40 mN/m.

15. A method for producing a component comprising the steps of: (a) applying a particle layer including a particulate material to a building platform in a first step with the aid of a powder coater; (b) applying a binder system in a second step with the aid of a dosing device; (c) subjecting the applied layer or layers to a heat treatment in another step with the aid of a heat source; and (d) lowering the building platform by the thickness of one layer, or raising the powder coater and possibly additional device components by thickness of one layer; wherein steps a) through d) are repeated until the component is built up wherein the binder system includes i) a novolak and/or a resol; and ii) a solvent; wherein the dosing device includes a print head, and the applied particulate material has a temperature of at least 60° C. during an entire build process until the component is built up; wherein a resin content of the binder system is less than 30 percent; and wherein boiling of the solvent is avoided so that the binder system penetrates deep enough to bind the layers.

16. The method of claim 15, wherein the binder system is applied with a print head.

17. The method of claim 16, wherein the binder system includes the novolak.

18. The method of claim 17, wherein the solvent includes an alcohol.

19. The method of claim 18, wherein the solvent includes ethanol, propanol-2, or water.

20. The method of claim of claim 16, wherein the binder system includes the resol.

* * * * *